June 10, 1930.  C. P. WEST  1,763,622
CONVERTER POLARIZING SYSTEM
Filed June 16, 1928
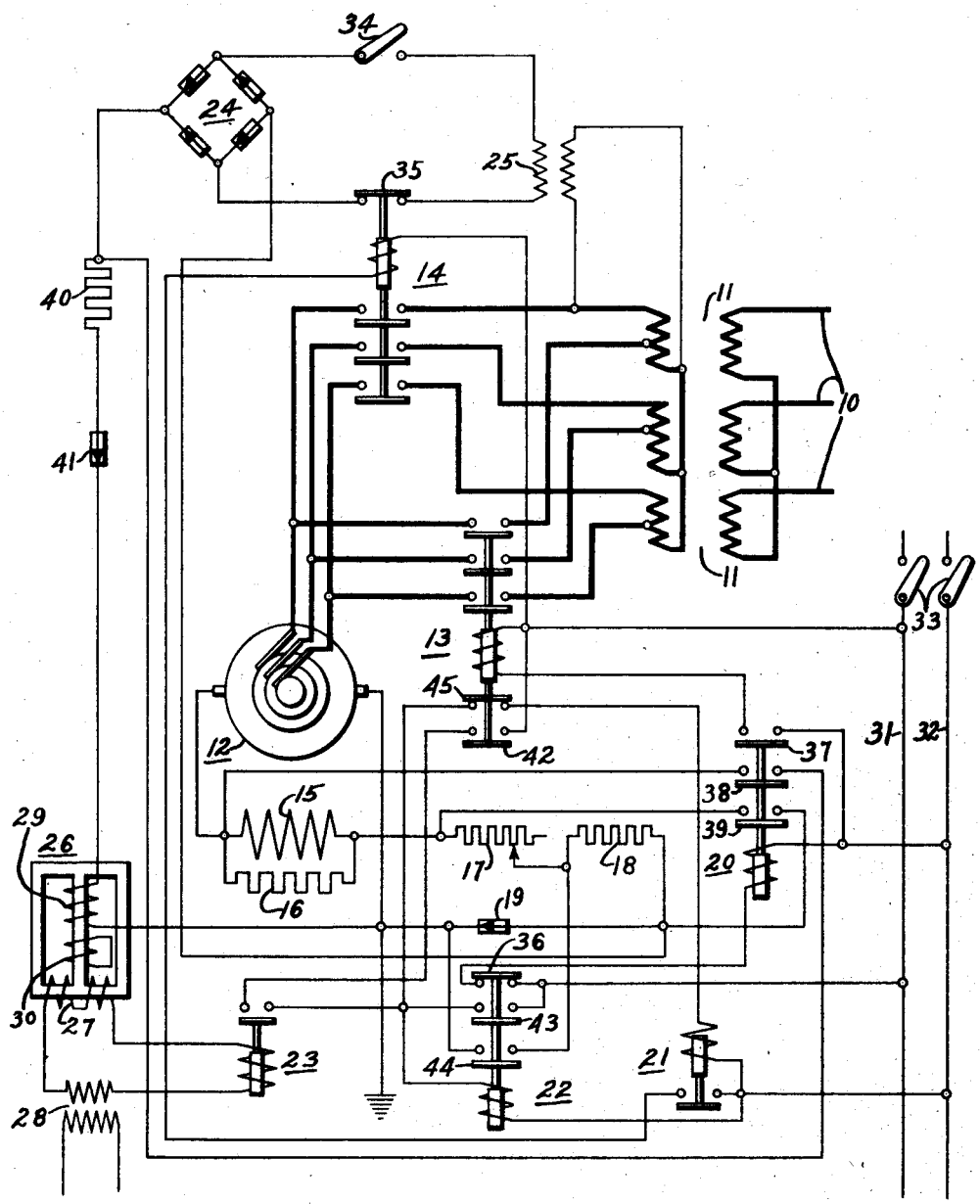
INVENTOR
Charles P. West
BY
*Wesley G. Carr*
ATTORNEY Patented June 10, 1930

1,763,622

UNITED STATES PATENT OFFICE

CHARLES P. WEST, OF PITTSBURGH, PENNSYLVANIA, ASSIGNOR TO WESTINGHOUSE ELECTRIC & MANUFACTURING COMPANY, A CORPORATION OF PENNSYLVANIA

CONVERTER POLARIZING SYSTEM

Application filed June 16, 1928. Serial No. 286,021. REISSUED

My invention relates to automatic sub-stations and, more particularly, to sub-stations of the type in which a synchronous rotary converter is adapted to be started automatically in response to different conditions, and connected to a direct-current load circuit.

One object of my invention is to provide means for insuring that a normally self-excited rotary converter in an automatic station will develop a predetermined polarity at its direct-current brushes.

Another object of my invention is to provide means for starting a synchronous converter on reduced voltage and automatically transferring it to a source of normal voltage when it accelerates to synchronous speed and develops a predetermined polarity at its direct-current brushes.

A further object of my invention is to provide means for so biasing the converter excitation that the machine will always develop the same polarity at its direct-current terminals.

A still further object of this invention is the provision of a starting system for a rotary converter in which the converter field is permanently connected in shunt to a resistor and in series with the converter brushes and during the starting period, in series with a uni-directional current-conducting device.

A still further object of this invention is the provision of a starting system for converters in which the shunt field is energized by one set of half-cycles of the alternating voltage which appears at the direct-current brushes during starting and also by a separate source of direct current during the starting period.

In accordance with my invention, I provide means for applying a reduced voltage to the armature of a synchronous converter. I connect the shunt field winding of the converter permanently to a resistor of comparatively high resistance. The shunt field winding is also connected across the direct-current brushes of the converter, and during starting, in series with a uni-directional current-conducting device. The shunt field winding is also connected to a separate source of direct current. By these means, the shunt field winding of the converter is always energized by current in a given direction during the starting period, and the converter develops a predetermined polarity at the direct-current brushes every time it is started.

I provide also, means for controlling the transfer of the converter armature from starting to running voltage. This means is responsive to the development of a definite polarity at the direct-current brushes of the converter.

The details of the system of my invention will be described hereinafter, and the novel features thereof will be pointed out in the appended claims. For a complete understanding of my invention, the accompanying drawing should be referred to in connection with the following description.

The single figure of the drawing is a diagrammatic illustration of the circuits and apparatus necessary for a satisfactory functioning of my invention.

Referring in detail to the drawing, a polyphase alternating-current source is indicated at 10. Transformers 11 have their primary windings connected to the source 10, while their secondaries are adapted to be connected to the slip rings of a synchronous converter 12.

The connection of the converter 12 to the secondaries of the transformers 11 is controlled by a starting switch 13 which connects the low-voltage taps of the transformer to the slip rings and a running switch 14, which, when closed, supplied full voltage from the transformers to the converter.

The converter field is indicated at 15 and is permanently shunted by a high-resistance shunt 16, and, at the same time, is connected across the converter brushes in series with a rheostat 17, a "field-killing" resistance 18 and a uni-directional current-conducting device 19. This last mentioned device is preferably a copper-oxide disc rectifier, although any other equivalent means may be substituted. The function of the resistor 18 is to reduce the converter excitation when the machine is disconnected from the circuit 10 to prevent it from "coasting" as a synchronous generator.

Auxiliary relays 20 and 21 are employed to control the operation of the starting and running switches and are, in turn, controlled by additional auxiliary relays 22 and 23, in a manner to be described in detail hereinafter.

A full-wave rectifier 24, which is also preferably of the copper-oxide disc type, is adapted to be energized by the transformer 25 connected to the secondary of one of the transformers 11. The direct-current terminals of the rectifier 24 are adapted to be connected to the terminals of the field winding 15, during the starting period.

To control the transfer of the converter armature from starting to running voltage, I make use of an iron-core reactor 26. This reactor has an alternating-current winding 27 connected to a source of alternating-current, such as a transformer 28, and to the winding of the relay 23. The reactor also has a direct-current winding 29 and a closed circuit winding 30.

The iron-core reactor serves as a control device and its operation is based upon the well-known principle that the super-position of a uni-directional flux upon an alternating flux in a magnetic circuit has the effect of reducing the impedance of the winding inducing the alternating flux. In the specific embodiment of my invention described, the impedance of the alternating-current winding 27 is high, as long as the direct-current winding 29 is substantially de-energized. When the winding 29 is energized, however, the impedance of the alternating-current winding 27 is decreased to a minimum.

The remaining features of my invention will be pointed out in connection with the following description of operation.

Energy for the operation of the control devices involved in my invention may be taken from control buses 31 and 32, which may be energized from any convenient current source. In order to initiate the operation of the system of my invention, it is only necessary to close the switches 33, which connect the control buses 31 and 32 to their source of supply, and the switch 34 which completes the circuit from the transformer 25 to the rectifier 24. The switches 33 and 34 may be closed by any suitable automatic means although for simplicity, they are here shown as manual switches.

Upon the closure of switch 34, a circuit is completed from the transformer 25 through the rectifier 24 and a normally closed switch 35 actuated by the running switch 14.

A circuit is completed by the closure of switch 33 for the operating coil of the relay 20, from the control bus 31, through a normally closed switch 36 of the relay 22, to the coil of the relay 20 and thus to the bus 32. The energization of the coil of relay 20 results in the closure of its normally open switches 37, 38 and 39. The closure of the switch 37 completes a circuit from the control bus 31, through the operating coil of the starting switch 13 and the switch 37 to the bus 32.

As a result of the completion of the just-mentioned circuit, the starting switch 13 is closed, and low voltage is applied to the slip rings of the converter which starts to rotate in the well known manner, the field winding of the converter being shunted through the high resistance 16. During the starting operation, an alternating current is induced in the circuit including the field winding 15 and the resistor 16. The field winding is shunted to prevent the occurrence of high voltages in the field circuit.

The closing of the switch 38 of the relay 20 connects the direct-current terminals of the rectifier 24 to the field winding 15, and the closing of the switch 39 short circuits the rheostat 17 and the resistor 18 in the field circuit.

During the starting period, in addition to the alternating current induced in the field winding which flows through the resistor 16, alternating current is also supplied to the field circuit from the converter brushes. This alternating current, however, is rectified by the rectifier 19 so that the converter field is energized only by the positive half-cycles of the alternating current from the converter brushes. The rectifier 24 also supplies direct current to the field winding 15 in the same direction as that which flows as a result of the alternating voltage at the converter brushes.

Thus, the field current which flows during the starting operation consists of three components, first, that which flows through the resistor 16; because of the alternating voltage induced in the field winding itself, second, that due to the alternating voltage on the converter brushes which is rectified and flows only in one direction through the field winding 15, and, third, the direct current supplied from the rectifier 24 to the field winding 15.

The system of my invention obviously may be so designed and arranged that the effect of the direct-current components of the field current are sufficient to overcome the effect of the alternating current flowing in the circuit composed of the winding 15 and the resistor 16.

It would be a simple matter to rectify the current in the latter circuit, but, as already stated, this current is permitted to circulate in the circuit 15—16 to prevent the abnormal voltages that would otherwise be induced therein, and the direct-current components of the field current are relied upon to bias the converter excitation so that the machine will accelerate to synchronous speed with a definite polarity at the direct-current brushes. By supplying sufficient direct current to nullify the effect of the negative half-cycles of the induced alternating current, it is possible to insure that the polarity of the direct-current brushes will always be the same.

It will be observed that the so-called direct-current winding 29 of the reactor 26 is connected across the converter brushes in series with a resistor 40 and a single-wave rectifier 41. This circuit is subject to alternating voltage of decreasing frequency which appears at the converter brushes as the converter accelerates to synchronous speed. The rectifier 41, however, prevents the negative half-cycle of this alternating current from flowing, and the winding 29 is energized, therefore, by a substantially constant direct current.

When the converter has accelerated to synchronous speed and developed a predetermined polarity at its direct-current brushes, the winding 29 of the reactor 26 will be sufficiently energized to substantially decrease the impedance of the winding 27. As long as the converter is below synchronous speed, however, the positive half-cycles of the alternating current flowing in the circuit including the winding 29, will be insufficient to energize the winding 29, so that the impedance of the winding 27 is substantially decreased. When the impedance of the winding 27 is reduced to a predetermined value, however, by the energization of the winding 29, the current supplied therethrough by the source 28 to the winding of the relay 23 is sufficient to energize the latter to cause it to close its switch. The closed-circuit winding 30 functions to introduce a time delay in the operation of the reactor 26, but is not essential and may be omitted if desired.

The closure of the switch of the relay 23 completes a circuit from the control bus 31 through the switch 42, which was closed by the operation of the relay 13, through the switch 23, the operating coil of the relay 22 and thence to the bus 32.

The energization of the operating coil of the relay 22 results in the opening of the switch 36 thereof and the closure of the switches 43 and 44. The opening of the switch 36 interrupts the circuit including the operating coil of the relay 20 which is thereupon de-energized to open the switches 37, 38 and 39. The opening of the switch 37 interrupts the circuit including the operating coil of the starting switch 13, which thereupon opens, and, at the same time, closes its switch 45 and opens its switch 42. The opening of the switch 42 interrupts the original energizing circuit of the relay 22 but a locking circuit for the operating coil of this relay is completed through its switch 43, which is closed when the relay is first energized. The closing of the switch 44 of the relay 22 short circuits "field-killing" resistor 18 and the rectifier 19. The opening of the switch 38 of the relay 20 disconnects the field winding 15 from the rectifier 24, and the opening of the switch 39 interrupts the circuit in shunt with the rheostat 17 and the resistor 18.

When the operations just described have been completed, a circuit is established for the operating coil of the relay 21, which extends from the control bus 31, through switch 43 of the relay 22, the switch 45 of the starting switch 13 and the operating coil of relay 21, to the bus 32. The relay 21, upon being energized, closes its switch to complete a circuit from the control bus 31, through the operating coil of the running switch 14 and the switch of the relay 21 to the control bus 32.

The running switch 14 is thereupon closed, and full voltage is applied to the armature of the converter. At the same time, the switch 35 is opened by the operation of the switch 14, and the energizing circuit of the rectifier 24 is interrupted.

It will be observed that upon the completion of the operations described, the converter will be connected to a source of normal voltage and will be running at synchronous speed, and there will be a definite predetermined polarity on the brushes of the converter. The connection of the converter to its direct-current load circuit may be effected by any known system of automatic switching, which forms no part of my invention.

The system of my invention may be utilized in connection with means for lifting the brushes of the converter during starting, or this feature may be entirely omitted, according to the characteristics of the converter in question.

The details of the system of my invention may also be altered to suit the circumstances of any installation. The rectifier 24, for example, may be replaced by any other convenient source of direct current. The transformer 28 may be connected to the same source as the power transformers 11, or any other convenient source of alternating current may be employed instead.

It will be obvious that the system of my invention insures that a synchronous converter, when automatically started, will always come into synchronism with a predetermined polarity on the direct-current brushes. This feature is a great advantage over systems of the prior art, in which the converter was allowed to come into synchronism at random, and its polarity was then checked and altered if incorrect.

Another advantage of the system of my invention resides in the fact that the field-winding circuit is never opened, but is permanently connected across the converter brushes. Because of the considerable inductance of this circuit, any interruption in the flow of current therein is attended with destructive arcing which it is desirable to avoid. The present system accomplishes this result.

I am aware that it has been common practice heretofore to flash the field of a synchronous converter to predetermine its polarity, but I believe I am the first to propose the use of a rectifier for suppressing the negative half-cycles of the alternating current flowing through the field winding from the converter brushes during the starting period in connection with a separate source of exciting current for the field winding.

As hereinbefore mentioned, changes may be made in the system of my invention, and I do not intend to be limited to the specific modification disclosed herein, except as necessitated by the appended claims and the state of the prior art.

I claim as my invention:

1. An automatic station comprising a rotary converter, provided with a field winding, a rectifier adapted to be connected in series with said field winding and the converter commutator during the starting of the converter, means for applying reduced voltage to the converter armature, an independent source of direct current adapted to be temporarily connected to said field winding, a relay, an alternating-current source, an iron-core reactor having an alternating-current winding connected in series with said relay to said alternating-current source, a direct-current winding on said reactor connected to the converter commutator for causing the operation of said relay, and switches controlled by said relay for transferring the converter armature from low voltage to normal voltage.

2. In an automatic station, a rotary converter, a resistor permanently shunted across the shunt field winding of the converter, a uni-directional current-conducting device adapted to be connected in series with the field winding and the converter commutator, a separate source of direct current adapted to be temporarily connected to said field winding, means for applying a reduced voltage to the armature, a relay for causing the armature to be transferred to full voltage when the converter attains synchronous speed and a definite polarity, control means for said relay including an iron-core reactor having an alternating-current winding connected to an alternating-current source in series with said relay, and a direct-current winding connected across the converter commutator.

3. An automatic translating station comprising a rotary converter having shunt field and armature windings, a rectifier adapted to be connected in series with the field winding across the converter commutator, a second rectifier for supplying direct current to said field winding during starting, means for applying a reduced voltage to the converter armature, a relay for transferring the armature to full voltage, a variable impedance responsive to a uniform voltage across the converter brushes for controlling the operation of said relay, whereby said transfer is effected automatically when the converter reaches synchronous speed and attains a definite polarity, and means for short-circuiting said first-mentioned rectifier and disconnecting said second rectifier.

4. In an automatic station, the combination with a rotary converter having shunt field and armature windings, a rectifier adapted to be connected in series with the field winding across the converter commutator, means for supplying reduced voltage to the armature to start the converter, means for supplying direct current to the field winding, of means for transferring the armature to full voltage including a reactor having alternating-current and direct-current windings, the direct-current winding being connected across the converter commutator, and a relay connected in series with said alternating-current winding.

5. The combination with a rotary converter having armature and shunt field windings, a uni-directional current-conducting device adapted to be connected in series with said field winding across the converter commutator, an independent source of direct current adapted to be temporarily connected to said field winding, of means for controlling the transfer of the converter armature to full voltage including a relay and a variable impedance connected in series therewith, and means effective when the converter attains synchronous speed and a definite polarity for reducing said impedance to operate said relay.

6. In an automatic station, a rotary converter having shunt field and armature windings, the field winding being connected permanently across the converter commutator, means for applying a reduced voltage to said armature winding to start the converter, means for preventing the flow of current in one direction through the field in response to the alternating voltage on the converter commutator during starting, and means including an iron-core reactor for transferring the converter armature to full voltage, responsive to a uniform voltage of a predetermined polarity at the converter brushes.

7. An automatic station comprising a rotary converter having shunt field and armature windings, means for connecting the shunt field winding across the converter commutator, means for starting the converter on reduced voltage, means for limiting the flow of current in the field in response to the alternating voltage on the converter commutator to one direction only, means for supplying current to said field winding in said direction, and means for limiting the flow of alternating current in said field winding in response to the alternating voltage induced therein during starting.

8. In an automatic station, the combination with a rotary converter, having a shunt field winding permanently connected across the converter commutator, means for starting the converter on reduced voltage, means for energizing the field winding of the converter with direct current, means for preventing the flow of current in one direction through said field as a result of the alternating voltage on the converter commutator, and means responsive to a definite polarity on said commutator for effecting the transfer of the converter armature to a source of normal voltage.

9. A starting system for a synchronous converter including means for applying reduced voltage to the converter armature to start the converter, means for limiting the flow of current to the field winding from the converter commutator during starting to one direction, and means responsive to a uniform voltage of definite polarity on said commutator for transferring the converter armature to a source of normal running voltage.

10. A starting system for synchronous converters including means for preventing flow of current in one direction to the converter field winding from the commutator of the converter during starting, and means, including an iron-core reactor, for transferring the converter from starting to running voltage when a uniform voltage of definite polarity exists on said commutator.

11. A starting system for synchronous converters comprising means for applying a reduced voltage to the converter armature and means including an iron-core reactor having direct-current and alternating-current windings responsive to the existence of a uniform voltage of definite polarity on the converter commutator for transferring the converter armature from a reduced voltage to full voltage.

In testimony whereof, I have hereunto subscribed my name this 12th day of June, 1928.

CHARLES P. WEST.